United States Patent Office 3,170,784
Patented Feb. 23, 1965

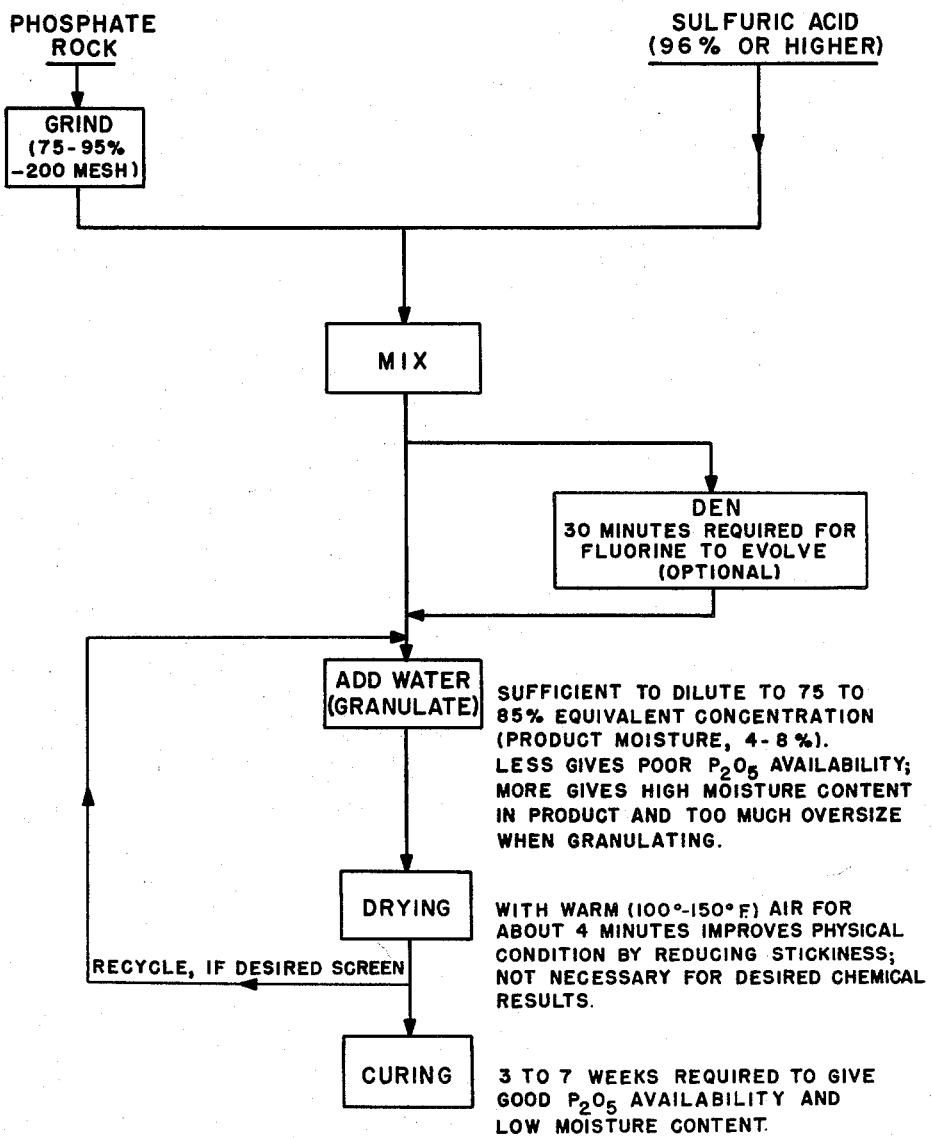

3,170,784
PRODUCTION OF ORDINARY SUPERPHOSPHATE WITH STRONG SULFURIC ACID
Larrabee D. Hand, Jr., Florence, Ala., assignor to Tennessee Valley Authority, a corporation of the United States
Filed Nov. 6, 1961, Ser. No. 150,600
2 Claims. (Cl. 71—40)
(Granted under Title 35, U.S. Code (1952), sec. 266)

The invention herein described may be manufactured and used by or for the Government for governmental purposes without payment to me of any royalty thereon.

My invention relates to a method of preparing granular ordinary superphosphate from strong sulfuric acid, and more particularly to a method for the production of granular superphosphate wherein the superphosphate material is granulated prior to curing, thereby eliminating the necessity of subsequently blasting or digging the material out of a curing pile.

The fertilizer industry has recognized the trend toward the desirability of producing fertilizer in granular form due to the need for better physical condition of high-analysis grades. Granulation of fertilizer material reduces caking, decreases dustiness, provides for easier and more uniform distribution, and results in a more attractive appearance of the product. Because of these benefits gained with granular high-analysis fertilizer grades, farmers are beginning to demand granulation of all solid fertilizers, including ordinary superphosphate. Furthermore, granulation of this fertilizer material is highly desirable if the superphosphate is intended for blending with other granular material.

Heretofore it has been the practice in the fertilizer industry, when producing granular ordinary superphosphate, to first obtain a product having desirable $P_2O_5$ availability by curing phosphate rock treated with conventional 70 percent sulfuric acid in a large, exposed pile and subsequently granulating the material by spraying water on the cured product in a rotating drum. The superphosphate material dries out and sets up into an extremely hard mass while curing in the pile. Such set-up material must be removed from the pile and sized prior to the granulation step. Due to the extreme hardness of the material, the removal from the pile often proves to be very difficult and requires the expenditure of considerable energy which may be in the form of actually blasting the material with explosives. Furthermore, because of the dryness of the cured product, considerable water must be added to obtain granulation and, even then, granulation has proved to be difficult and hard to control. Such processes of the prior art result in the formation of substantial quantities of both oversize material and fines. Considerable drying must be accomplished to remove the excess water and to effect the strengthening of the granules that are formed. The oversize material must be crushed, and both the oversize and fines must be recycled. Obviously, these prior-art processes for the production of granular ordinary superphosphate leave much to be desired.

My invention is directed to a method of producing granular ordinary superphosphate which eliminates the process step of denning the superphosphate material with the accompanying requirement for digging or blasting the same from a pile, as is disclosed in the prior art. I have overcome the difficulties inherent in the processes of the type of the prior art to a substantial extent in the present invention by a process which comprises acidulating phosphate rock with strong sulfuric acid, holding the resulting powdery acidulate for a period of approximately 30 minutes to effect fluorine removal therefrom and then adding water to the acidulate in a rotary drum, wherein it is granulated. Furthermore, several new and advantageous features over conventional processes for the production of superphosphate are realized by the present invention.

Among these advantageous features are extremely desirable high $P_2O_5$ availability, good physical properties, low moisture content, and low fluorine content in the material produced.

It is therefore an object of the present invention to provide a process for the economical production of granular ordinary superphosphate which substantially eliminates the necessity for curing a superphosphate material in large storage piles prior to granulation.

Another object of the present invention is to provide a process for the economical production of granular ordinary superphosphate which substantially eliminates the necessity for curing a superphosphate material in large storage piles prior to granulation, thereby eliminating the formation of large piles of extremely hard, set-up material, which require large expenditures of energy for the formation of pulverulent material therefrom.

Still another object of the present invention is to provide a method for the production of granular ordinary superphosphate in which the recycle rate of fines and crushed oversize material is substantially reduced, thereby greatly increasing the capacity of existing process equipment.

A further object of the present invention is to provide a process for the production of ordinary granular superphosphate material in which a large proportion of the fluorine in the rock is caused to volatilize during acidulation.

A still further object of the present invention is to provide a method for the production of ordinary superphosphate fertilizer material in which approximately 3 times as much of the fluorine content in the phosphate rock treated is volatilized therefrom as compared to standard prior-art processes for making granular superphosphate material.

An additional object of the present invention is to provide a method for the production of ordinary granular superphosphate in which the product, after curing, has desirable $P_2O_5$ availability, good physical properties, and low moisture and fluorine contents.

In carrying out the objects of my invention in one form thereof, I have discovered that a powdery, nonstickable acidulate is formed when fine phosphate rock and strong sulfuric acid of concentration in the range of about 96 percent to 99 percent are mixed. I have observed that the physical properties of this acidulate are conducive to very efficient granulation. In carrying out my process, a closely sized granular product can be produced by spraying water on the above-mentioned powdery acidulate in a rotating drum. Sufficient water can be added to the material in the granulation step to raise the moisture content of crushed product to the 4 to 5 percent required to obtain desirable conversion of the $P_2O_5$ to an available form. In addition it has been found that, if desired, the acidulate may be held for a period of time before adding the water to permit the fluorine to evolve. Also, the $P_2O_5$ availability obtained after curing has been observed to be as good as or better than that obtained in the conventional production of ordinary superphosphate, and the fluorine evolution is increased to 50 to 60 percent greater than that obtained in any conventional processes of the prior art.

My invention, together with further objects and advantages thereof, will be better understood from consideration of the following description taken in connection with the accompanying drawing in which:

The figure is a flowsheet illustrating the principles of my novel process which results in granular superphosphate fertilizer having the properties mentioned above.

Referring now more specifically to the figure, phosphate rock is ground to 75 to 95 percent minus-200 mesh. Sulfuric acid of 96 percent strength, or higher, is mixed with the ground phosphate rock, and the resulting powdery acidulate is held for a period of approximately 30 minutes, in which time the fluorine is evolved. After the short holding period, the acidulate is granulated in a simple, horizontally inclined rotating drum by spraying water on same in quantity sufficient to dilute the acid content to about 80 percent $H_2SO_4$. The granulated material is then directly passed on to the curing step or, preferably, it may be exposed to warm air (100° F. to 150° F.) for a period of about 4 minutes to improve its physical condition by reducing moisture content.

Any batch or continuous mixer currently used in ordinary superphosphate plants would be satisfactory. Obtaining the powdery, nonsticky material has been found to depend primarily on the acid concentration and the particle size of the rock. When using sulfuric acid having an $H_2SO_4$ content of 96 percent, it is necessary to size the rock to 94 to 96 percent through 200 mesh. It would be necessary to grind the rock even finer if a more dilute acid were to be used. Thus, 96 percent acid, which is easily made in contact sulfuric acid plants, is about the lowest concentration practical due to the difficulty in grinding the rock finer than 200 mesh.

It has been found, conversely, that somewhat coarser rock may be used by increasing the acid concentration. The standard particle size, 70 to 80 per cent minus-200 mesh, may be used with fuming acid (15 to 18 percent free $SO_3$).

It has been found that both the $P_2O_5$ availability of the finished product and the evolution of fluorine from the rock during acidulation are affected by the acid concentration. The $P_2O_5$ availability is about 2 percentage points lower when using fuming acid (15 to 18 percent free $SO_3$) than when using 96 percent acid. The $P_2O_5$ availability also varies with the grade of the rock when using particle sizes of about 95 percent minus-200 mesh; it is 2 to 3 percentage points higher when high-grade rock is used as opposed to low-grade rock. The $P_2O_5$ availability in the product produced from high-grade rock is increased by decreasing the particle size from about 75 to 95 percent minus-200 mesh; but with low-grade rock as raw material the $P_2O_5$ availability is not affected appreciably. The evolution of fluorine increases 40 to 50 percent or more when using the strong acid rather than the conventional 70 percent sulfuric acid. The exact amount depends upon the acid concentration, and type and grade of phosphate rock used. It has been found that approximately 30 minutes is sufficient to evolve the fluorine before the water-addition granulation step.

The amount of water which is added to the granulation step should be that necessary to give a product with a moisture content of about 4 to 8 percent. If the moisture content is less than about 4 percent, conversion of $P_2O_5$ to an available form will be too slow. On the other hand, if the moisture content is higher than about 8 percent, it has been found that the material will overagglomerate in the granulator and the moisture level of the cured product will be so high that the grade will be undesirably reduced. Thus, by keeping the moisture content in the 4 to 8 percent range, good granulation can be obtained and the product will not agglomerate severely, even with no recycle. Warm (100° F. to 150° F.) air may be used in carrying out the process in one form thereof to "surface dry" or "caseharden" the fresh product granules. Such a procedure will permit the use of part of the product as recycle or to improve the physical condition, if desired. It has been found that only a few minutes of exposure of the fresh product to the warm air is necessary to effect the surface drying thereof.

After granulation and/or drying of the product, it has been found necessary to cure the fresh granules to obtain a desirable end product. The curing time required varies from about 2 to 7 weeks. After proper curing, the $P_2O_5$ availability in the granular product has been found to be 95 percent or higher, and the moisture is reduced to less than about 1 percent.

In order that those skilled in the art may better understand how the present invention can be practiced, the following examples are given by way of illustration and not by way of limitation.

EXAMPLE I

Low-grade (32 percent $P_2O_5$) Florida phosphate pebble ground to 96 percent through 200 mesh was acidulated with 96 percent sulfuric acid, the quantity of acid added being sufficient to yield a mole ratio of ($P_2O_5+SO_3$) to lime of about 1:1. The acidulate was held for 30 minutes, during which time 54 percent of the fluorine in the rock was evolved. After the 30-minute period, the material was granulated in a rotating drum by spraying water on it in quantity sufficient to dilute the acid to about 80 percent $H_2SO_4$. About 70 percent of the product was minus 6- plus 20-mesh material. After curing for 3 weeks at 150° F. in a sealed container, the available $P_2O_5$ content was 20.3 percent and the moisture content was 0.9 percent.

EXAMPLE II

The same procedure was followed as in Example I above, except that high-grade (35 percent $P_2O_5$) Florida pebble ground to 94 percent minus 200 mesh was used, and after granulation the fresh product was casehardened for 4 minutes. About 45 percent of the fluorine in the rock was evolved during the 30-minute holding period. About 86 percent of the granular product was minus 6- plus 20-mesh material. The moisture content of the product immediately after drying was 4.8 percent. After curing for 7 weeks at 150° F., the available $P_2O_5$ content was 21.0 percent and the moisture content was 1.2 percent.

EXAMPLE III

The same procedure was followed as in Example II above, except that fuming acid (15 to 18 percent free $SO_3$) was used. The granules were not casehardened and the mole ratio of ($P_2O_5+SO_3$) to lime was 1.02:1. During the holding period 49 percent of the fluorine was evolved. About 78 percent of the product was minus 6- plus 20-mesh material. After curing for 5 weeks, the available $P_2O_5$ content was 21.4 percent and the moisture content was 2.0 percent.

EXAMPLE IV

A coarser (77 percent minus-200 mesh) high-grade phosphate rock was substituted for the fine rock used in Example III above. The fluorine evolution and the available $P_2O_5$ content were the same as in Example III; however, the available $P_2O_5$ was only 93 percent of the total, versus 97 percent of the total shown in Example II. The moisture content of the product was 1.0 percent. About 74 percent of the product was minus 6- plus 20-mesh material.

EXAMPLE V

The same procedure was followed as in Example IV above, except that about 6 percent more acid was used. During the holding period 52 percent of the fluorine was evolved. About 77 percent of the product was minus 6- plus 20-mesh material. After curing for 5 weeks, the $P_2O_5$ content was 21.4 percent, the available $P_2O_5$ was 96 percent of the total, and the moisture content was 1.0 percent. The free acid content, 1.6 percent, was in an acceptable range.

Best conditions are summarized below:

Acid concentration _____ 96 percent $H_2SO_4$.
Rock particle size _____ 95 percent minus - 200 mesh.
Denning time _____ 30 minutes.
Water added _____ To give equivalent acid concentration of about 80 percent $H_2SO_4$; product moisture content of 6 percent to 8 percent.
Drying _____ Warm (100°–150° F.) air; for 4 minutes.
Curing period _____ 3 to 7 weeks.

The results of the several tests described in Examples I–V above are shown in the following table.

Table 1

| Test No. | Acid, percent $H_2SO_4$ | Rock analysis, percent | | Product analysis, percent | | | | | | Fluorine evolution,[1] percent |
|---|---|---|---|---|---|---|---|---|---|---|
| | | $P_2O_5$ | −200 mesh | Chemical, $P_2O_5$ | | | $H_2O$ | Screen, −6 +20 mesh | | |
| | | | | Total | A.P.A. | Availability | | | | |
| 1 | 96 | 32 | 96 | 21.2 | 20.3 | 96 | 0.9 | 69 | | 54 |
| 2 | 96 | 35 | 94 | 21.4 | 21.0 | 98 | 1.2 | 86 | | 45 |
| 3 | [2]103.6 | 35 | 94 | 22.0 | 21.4 | 97 | 2.0 | 78 | | 49 |
| 4 | [2]103.6 | 35 | 77 | 23.0 | 21.4 | 93 | 1.0 | 74 | | 49 |
| 5 | [2]103.6 | 35 | 77 | 22.2 | 21.4 | 96 | 1.0 | 77 | | 52 |

[1] During holding period.
[2] Fuming acid.

While I have shown and described a particular embodiment of my invention, modifications and variations thereof will occur to those skilled in the art. I wish it to be understood, therefore, that the appended claims are intended to cover such modifications and variations which are within the true scope and spirit of my invention.

What I claim as new and desire to secure by Letters Patent of the United States is:

1. A process for the production of granular ordinary superphosphate fertilizer material which comprises acidulating in a first vessel fine phosphate rock of more than about 90 percent minus-200 mesh with sulfuric acid of a concentration greater than about 96 percent $H_2SO_4$, the quantity of said acid added being sufficient to yield a mole ratio in the final product of ($P_2O_5$+$SO_3$) to lime of about 1:1; holding in a second vessel the resulting powdery acidulate for a period of about 30 minutes to evolve at least about 50 percent of the fluorine originally present in said phosphate rock, said acidulate resulting from the acidulation of said fine phosphate rock by said sulfuric acid and said acidulate characterized as a substantially dry and non-stickable discrete particulate mass; subsequently adding water to the resulting powdery acidulate in quantity sufficient to dilute said acid to about 80 percent $H_2SO_4$, the total quantity of water introduced into said resulting powdery acidulate (including that added indirectly through the addition of water present in said sulfuric acid and that added directly to said resulting acidulate) being sufficient to yield a final product having a moisture content in the range from about 4 to 8 weight percent; granulating the resulting powdery acidulate; and transferring the resulting granules directly to storage for a period of about 3 to 7 weeks until final equilibrium conditions are attained, said process being characterized by the fact that said granules have a $P_2O_5$ availability greater than about 96 percent by weight.

2. A process for the production of granular ordinary superphosphate fertilizer material which comprises acidulating fine phosphate rock of more than about 77 percent minus-200 mesh with fuming sulfuric acid, the quantity of said acid added being sufficient to yield a mole ratio in the final product of ($P_2O_5$+$SO_3$) to lime of about 1:1; holding the resulting powdery acidulate for a period of about 30 minutes to evolve fluorine therefrom, said acidulate resulting from the acidulation of said fine phosphate rock by said sulfuric acid and said acidulate characterized as a substantially dry and non-stickable discrete particulate mass; subsequently adding water to the resulting powdery acidulate in quantity sufficient to dilute said acid to about 80 percent $H_2SO_4$, the total quantity of water introduced into said resulting powdery acidulate (including that added indirectly through the addition of water present in said sulfuric acid and that added directly to the powdery acidulate) being sufficient to yield a final product having a moisture content in the range from about 4 to 8 weight percent; granulating the resulting powdery acidulate; and transferring the resulting granules directly to storage for a period of several weeks until final equilibrium conditions are attained, said process being characterized by the fact that said granules have a $P_2O_5$ availability greater than about 96 percent by weight.

References Cited by the Examiner
UNITED STATES PATENTS

| | | | |
|---|---|---|---|
| 2,504,546 | 4/50 | Wight et al. | 71—40 |
| 2,680,679 | 6/54 | Harvey et al. | 71—37 |
| 2,844,455 | 7/58 | Harris | 71—37 X |
| 2,882,127 | 4/59 | Le Baron | 23—109 |
| 2,906,602 | 9/59 | Purvis | 23—109 |
| 3,041,158 | 6/62 | Boylen et al. | 71—40 |

DONALL H. SYLVESTER, *Primary Examiner.*
GEORGE D. MITCHELL, ANTHONY SCIAMANNA, A. LOUIS MONACELL, *Examiners.*